US012682118B2

(12) United States Patent
Berndorfer et al.

(10) Patent No.: US 12,682,118 B2
(45) Date of Patent: Jul. 14, 2026

(54) UNIQUE CONTENT DETERMINATION OF STRUCTURED FORMAT DOCUMENTS

(71) Applicant: CONNECTING SOFTWARE INC., Denver, CO (US)

(72) Inventors: Thomas Berndorfer, Ponta do Sol (PT); Stanislav Pernecký, Moravský Svätý Ján (SK)

(73) Assignee: CONNECTING SOFTWARE, INC., Denver, CO (US)

( * ) Notice: Subject to any disclaimer, the term of this patent is extended or adjusted under 35 U.S.C. 154(b) by 152 days.

(21) Appl. No.: 18/250,644

(22) PCT Filed: Nov. 9, 2021

(86) PCT No.: PCT/US2021/058514
§ 371 (c)(1),
(2) Date: Apr. 26, 2023

(87) PCT Pub. No.: WO2022/099163
PCT Pub. Date: May 12, 2022

(65) Prior Publication Data
US 2024/0005043 A1      Jan. 4, 2024

Related U.S. Application Data

(60) Provisional application No. 63/111,237, filed on Nov. 9, 2020.

(51) Int. Cl.
G06F 21/00        (2013.01)
G06F 21/64        (2013.01)
(52) U.S. Cl.
CPC ..................................... G06F 21/64 (2013.01)
(58) Field of Classification Search
CPC ....................................................... G06F 21/64
(Continued)

(56) References Cited

U.S. PATENT DOCUMENTS 7,809,685 B2 * 10/2010 Wolff ...................... G06F 21/64
                                                                          707/648
11,366,457 B1 * 6/2022 George, Sr. ...... G05B 19/41885
(Continued)

FOREIGN PATENT DOCUMENTS

| JP | 2002229448 A | 8/2002 | ............. G06F 17/21 |
| JP | 2006101284 A | 4/2006 | ............. G06F 17/21 |
| JP | 2012011204 A | 1/2012 | ............. A61K 9/22 |

OTHER PUBLICATIONS

Anonymous, "Office Open XML, Part 2: Open Packaging Conventions," 50 pages, Dec. 1, 2006.

(Continued)

*Primary Examiner* — Josnel Jeudy
(74) *Attorney, Agent, or Firm* — Slayden Grubert Beard PLLC

(57) ABSTRACT

A computer-implemented method of generating a digest for a structured document is provided including selecting a subset of a plurality of component parts of a OOXML document wherein at least one of the selected subset of component parts is an XML file and wherein selecting the subset excludes files named "docProps\app.xml", "docProps\core.xml", and "docProps\custom.xml", ordering the selected subset of component parts, processing a relationships file by removing at least one relationship entry that references a component part not included in the selected subset and sorting the relationships by identifier value, generating a component hash value for each of the selected subset of component parts; and converting each component hash value into a byte array and appending the byte array to a canonical byte stream.

14 Claims, 7 Drawing Sheets

(58) Field of Classification Search
USPC .......................................................... 726/26
See application file for complete search history.

(56)                     References Cited

U.S. PATENT DOCUMENTS

| | | | |
|---|---|---|---|
| 2002/0099733 A1 | 7/2002 | Teruuchi et al. | ............. 715/234 |
| 2010/0263060 A1 | 10/2010 | Charbonneau | ................. 726/30 |
| 2019/0179804 A1* | 6/2019 | Chittaro | ............. G06F 16/1827 |
| 2019/0236273 A1* | 8/2019 | Saxe | ..................... G06F 18/214 |
| 2022/0038113 A1* | 2/2022 | Dupont | ................ H03M 7/405 |

OTHER PUBLICATIONS

Japanese Office Action, Application No. 2023-527982, 8 pages, Nov. 25, 2024.
Search Report for International Application No. PCT/US2021/058514, 12 pages, Feb. 25, 2002.
Anonymous: "Office Open XML Part 2: Open Packaging Conventions", Oct. 1, 2006.
Japanese Office Action, Appplication No. 2025-027731, 7 pages, dated Jan. 28, 2026.

* cited by examiner

200

Tips for flying — 202

204

- Pack toiletries in your carry-on bag in case your checked luggage is delayed.

- Bring a water bottle to stay hydrated.

- Sleep on east-bound flights and stay awake on west-bound flights.

206

208

| Checklist | |
|---|---|
| Passport | |
| Ticket | |
| Clothes | |
| Toiletries | |
| Shoes | |
| Jacket | |

400

```
402 — <Types xmlns="http://schemas.openxmlformats.org/package/2006/content-types">
404 — <Default Extension="png" ContentType="image/png"/>
             404a                           404b
406 — <Default Extension="rels"
             ContentType="application/vnd.openxmlformats-package.relationships+xml"/>
408 — <Default Extension="svg" ContentType="image/svg+xml"/>
410 — <Default Extension="xml" ContentType="application/xml"/>
412 — <Override PartName="/word/document.xml" ContentType="....document.main+xml"/>
                        412a                                    412b
414 — <Override PartName="/word/numbering.xml" ContentType="....numbering+xml"/>
416 — <Override PartName="/word/styles.xml" ContentType="....styles+xml"/>
418 — <Override PartName="/word/settings.xml" ContentType="....settings+xml"/>
420 — <Override PartName="/word/webSettings.xml" ContentType="....webSettings+xml"/>
422 — <Override PartName="/word/fontTable.xml" ContentType="....fontTable+xml"/>
424 — <Override PartName="/word/theme/theme1.xml"
             ContentType="application/...officedocuemnt.theme+xml"/>
426 — <Override PartName="/docProps/core.xml"
             ContentType="application/...package.core-properties+xml"/>
428 — <Override PartName="/docProps/app.xml"
             ContentType="application/...extended-properties+xml"/>
      </Types>
```

FIG. 4

UNIQUE CONTENT DETERMINATION OF STRUCTURED FORMAT DOCUMENTS

CROSS-REFERENCE TO RELATED APPLICATIONS

This application is a U.S. National Stage Application of International Application No. PCT/US2021/058514 filed Nov. 9, 2021, which designates the United States of America, and claims priority to U.S. Provisional Application No. 63/111,237 filed Nov. 9, 2020, the contents of which are hereby incorporated by reference in their entirety.

FIELD OF THE INVENTION

The present disclosure relates to analyzing the content of structured format documents.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Digital files are used for different purposes across many industries. Some industry regulations, such as HIPAA, SOX, GDPR, and ISO 9000 place restrictions on digital files must be secured, authenticated, or audited.

Hashing is commonly used to assess the contents of a file. A hashing algorithm maps the contents of a file to a hash value (also called a digest value) using a one-way function. A change to any data in the file will cause a different hash value. Relevant hashing algorithms include Message Digest 5 (MD5), Rivest-Shamir-Adleman (RSA), Secure Hash Algorithm (SHA), Scrypt, Ethash, and cyclic redundancy check (CRC), without limitation.

Hashing can be used to determine whether a file has changed or updated by calculating the current hash value of a file and comparing that to a previous hash value for the file. If the hash values are different, then the contents of the digital file have changed since the last hash value was calculated. A matching hash value confirms to a high degree of certainty that the content of the digital file has not changed.

A digital seal can be created for a digital file by using hashing. A digital seal may include a hash value stored in a blockchain ledger, e.g., a Bitcoin or Ethereum ledger. The hash value can be read from the digital seal to verify the contents of the file match those of the file at the time the digital seal was created. The digital seal may be managed with blockchain technology to ensure the authenticity of the digital seal. Users or systems may prove data integrity and authenticity of digital files with this approach because data errors and intentional modifications to a file will result in a different hash value.

Structured digital files, such as Microsoft Office™ files (e.g., Word™, Excel™, PowerPoint™, etc.), contain various information, including for example content, formatting, and metadata information. These files may be stored in the Open Office XML (OOXML) format. Metadata information, like the last access date or print date of a file, may update or change when a file is accessed even though the substantive information in the file has not changed.

As the inventors of the instant application have determined, using the entire contents of a structured document, including information that is not relevant to data integrity or authenticity, can limit the effectiveness of hashing and digital seals. In addition, the order data is stored in a digital file may also cause variation in hashing results, when in fact, the underlying data in the file is the same. More specifically, differences between documents may not indicate differences in the content or presentation of the document. These non-substantive differences may cause traditional sealing and authentication processes to fail after a document has been opened by an office document editor even if the user made no changes to the document.

SUMMARY

An object of the invention is to improve the usefulness of hashing and digital sealing of structured documents, e.g., OOXML, by hashing only the content of structured documents to avoid false indications of changes between copies of a particular document. This object is solved by the subject matter according to the claims recited below.

Examples of the invention are described in the claims, the following description, and the drawings.

A computer-implemented method is provided for generating a digest for a structured document. The method includes selecting a subset of a plurality of component parts of a OOXML document wherein at least one of the selected subset of component parts is an XML file and wherein selecting the subset excludes files named "docProps\app.xml", "docProps\core.xml", and "docProps\custom.xml"; ordering the selected subset of component parts; processing a relationships file from the selected subset of component parts. Processing the relationships file includes removing at least one relationship entry that references a component part not included in the selected subset and sorting the relationships by identifier value. The computer implemented method further includes generating a component hash value for each of the selected subset of component parts and converting each component hash value into a byte array and appending the byte array to a canonical byte stream.

A computer-implemented method of generating a digest for a structured document is provided including selecting a subset of a plurality of component parts of a structured document, ordering the subset of component parts, generating a component hash value for each of the subset of component parts, and converting each component hash value into a byte array and appending the byte array to a canonical byte stream. In some examples, the structured document is an OOXML file, which is a ZIP archive and each of the plurality of component parts is a file. In some examples, the method includes calculating an overall hash value for the canonical byte stream. In some examples, the selected subset of component parts does not include any of the following dates: a date on which the structured document was created, a date on which the structured document was last printed, a date on which the structured document was last edited, a date on which the structured document was last opened. In some examples, the selected subset of component parts includes a relationships file named "_rels\.rels" wherein the relationships file contains a relationship of type "officeDocument". In some examples, the selected subset of component parts does not include a document named "custom.xml". In some examples, the computer-implemented method includes storing the overall hash value for the canonical byte stream in a record, selecting a second subset of the second plurality component parts, ordering a second plurality of component parts of a second structured document, generating a second component hash value for each of the second subset of component parts, converting each second hash value into a second byte array and appending the second byte array to a second canonical byte stream, calculating a second overall hash value for the second canonical byte stream; and determining the structured document is substantially identical to the second structured document if the second hash value for the second canonical byte stream matches the overall hash value in the record.

A non-transitory computer readable medium is provided that contains executable software instructions that when executed select a subset of a plurality of component parts of a structured document, order the subset of component parts, generate a component hash value for each of the subset of component parts, and convert each component hash value into a byte array and appending the byte array to a canonical byte stream. In some examples, the structured document is an OOXML file, which is a ZIP archive and each of the plurality of component parts is a file. In some examples, the medium further comprising instructions that when executed calculate an overall hash value for the canonical byte stream. In some examples, the selected subset of component parts does not include any of the following dates: a date on which the structured document was created, a date on which the structured document was last printed, a date on which the structured document was last edited, or a date on which the structured document was last opened. In some examples, the selected subset of component parts includes a relationships file named "_rels\.rels" wherein the relationships file contains a relationship of type "officeDocument". In some examples, the selected subset of component parts does not include a document named "custom.xml". In some examples, the medium includes instructions that when executed store the overall hash value for the canonical byte stream in a record, select a second subset of the second plurality component parts, order a second plurality of component parts of a second structured document, generate a second component hash value for each of the second subset of component parts, convert each second hash value into a second byte array and append the second byte array to a second canonical byte stream; calculate a second overall hash value for the second canonical byte stream, and determine the structured document is substantially identical to the second structured document if the second hash value for the second canonical byte stream matches the overall hash value in the record.

DESCRIPTION OF DRAWINGS

FIG. 4 is an OOXML document contents file according to embodiments of the present disclosure.

DESCRIPTION

Figure 1:
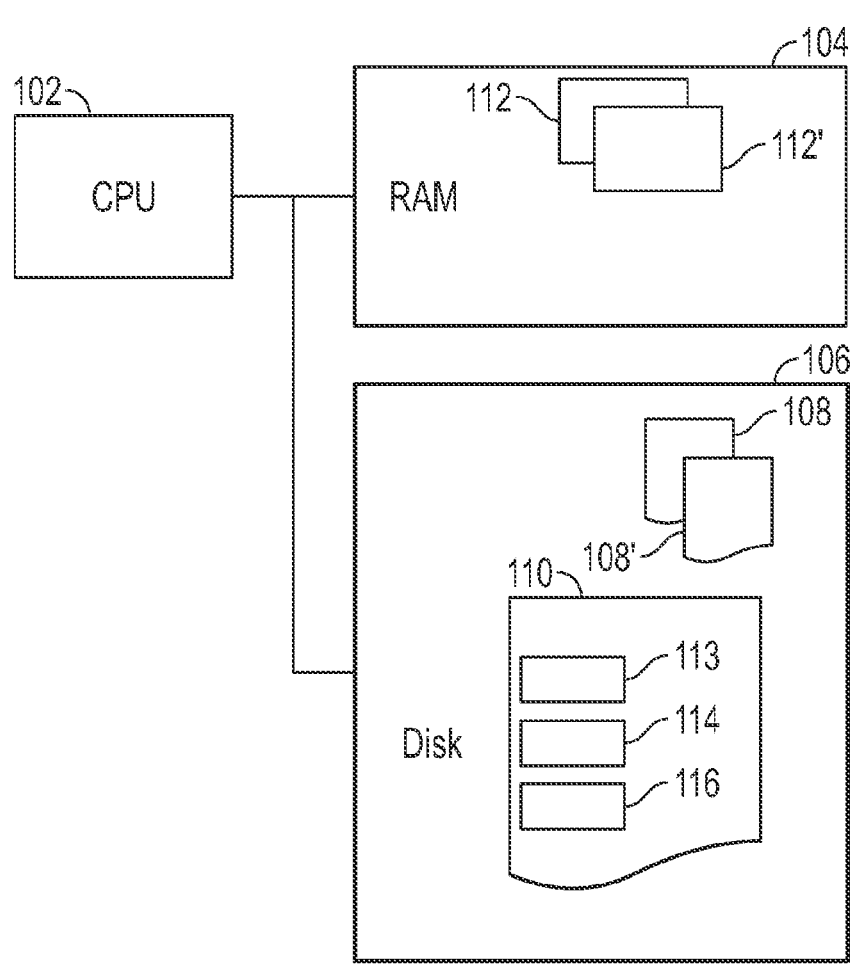
FIG. 1 is a system for processing a document according to embodiments of the present disclosure.

As discussed in the preceding, the teachings herein concern improved methods for hashing and sealing structured digital files. Digital files can be represented in different file formats. In some file formats a document is a package file containing a set of files representing the content, formatting, and other aspects of that document. For example, a Microsoft Office™ document is stored in Office Open XML (OOXML) file format. The OOXML file format packages numerous XML files containing the contents of a Microsoft Office™ document. These files may be stored in Open Packaging Convention (OPC) package that includes XML and data files of the content, format, and metadata of the Microsoft Office document packaged together in a ZIP archive file. Examples Microsoft Office™ documents that can be processed with the present disclosure include files with DOCX, XLSX, and PPTX file extensions that are stored in the OOXML format. Another standard open document format is the Open Document Format (ODF). An ODF document is ZIP archive package of XML files, as explained more detail below. Other types of structured digital files may be suitable as well.

Many structured documents do not require a particular order of internal files and may allow for content to appear in a different order within an internal file without altering the appearance or content of the office document. For example, an office document may define a list of styles such as Heading, BodyText, Heading 1, Heading 2, etc. The definitions of these styles may be rearranged without any change to the appearance or content of the document. In some examples, the style definitions might be part of a larger structured file (e.g., an XML file) and may be at the beginning, middle or end of that file without changing the appearance or content of the document. A document created by one application (e.g., Microsoft Office Word™) may save style information in one order and in one location of a word processing document. Structured documents may be stored in a content management system (CMS) that may alter document metadata. One such CMS system is SharePoint™. When a user opens a document in a CMS, the CMS may modify the metadata to note the date the document was open, e.g., by updating the date of the list item modification, without altering the document. More specifically, the document would remain identical to a user viewing or printing the document, but a hash of the entire document would not match the hash of the original document.

According to some examples of the present disclosure, one or more components may be used to prepare or process a digital file for hashing and digital sealing. For example, in some embodiments, a canonical formatter may be used to arrange a package of files representing a digital file in a canonical form for hashing. The canonical formatter generates a canonical stream of the digital file for hashing. A package part selector is used to select one or more parts of a digital file for hashing. A relationship information processor processes relationship information according to information contained in the digital file or information identified by a universal resource identifier in the file.

FIG. 1 is a system for processing a document according to embodiments of the present disclosure. System 100 includes central processing unit (CPU) 102, random access memory (RAM) 104, and disk 106. Disk 106 is a non-transitory, computer readable medium that stores document 108 and program 110. Document 108 is a document to be digitally sealed, e.g., formatted according to an XML-based open document standard. Program 110 is a software program for performing the method described in this disclosure. In operation, CPU 102 loads program 110 into RAM 104 and executes program 110. Program 110 loads document 108 into RAM and performs the method described in this disclosure to generate a canonical stream 112 of a portion of the contents of document 108. A later execution of program 110 on document 108' will generate canonical stream 112'. A comparison of canonical streams 112 and 112' (e.g., by hashing each and comparing their hash values) will determine whether the relevant contents of document 108 matches those of document 108'.

Program 110 includes canonical transformation 113. Canonical transformation 113 arranges the package of files representing a digital file in a canonical order to control the sequence of hash values to be combined into a final digest of the document. In some examples, canonical transformation 113 may apply rules to arrange the files within a document in an order independent of the order the files are stored in the package. The canonical formatter does not modify the digital file or the contents of the package representing the same, but instead generates a canonical form of data in RAM 104 for hashing and verifying the contents of a file in a manner that is independent of the order of the contents of the package.

The Microsoft OPC Digital Signing Framework illustrates an example canonical formatter for OPC packages. The Digital Signing Framework standardizes the creation and validation of hash values for OPC packages. The framework specifies the canonical form by a universal resource identifier within the OPC package. For example, the OPC Digital Signing Framework identifies a manifest file identified the "manifest" tag in the OPC package. An example manifest tag is: <Manifestxmlns:opc="http://schemas.openxmlformats.org/package/2006/digital-signature">. The manifest file is a collection of all package parts and package relationships. The contents of the manifest file can be used by the OPC Digital Signing Framework to arrange the OPC package in a canonical form for hashing. In some examples, the manifest file is signed using the SignedXml API and the signature saved in the OPC package along with the manifest file. OPC Digital Signing Framework supports the W3C XML Digital Signature standard (which may be found at https://www.w3.org/TR/xmldsig-core1/) and the processing of the OPC package contents.

In some examples, program 110 includes package part selector 114. Package part selector 114 selects parts of the package (e.g., the document to be hashed) to be included in the hash generation. In some examples, package part selector 114 reads a file external to the document and that file specifies parts of the document will be included and/or excluded from the hashing process. In some examples, package part selector 114 determines which information to use or exclude for hashing based on a predetermined set of criteria including attributes or relationships defined within a document.

In some examples, selection criteria is included expressly in the digital file to be digested. One approach is to include a flag within the manifest file indicating which files should be included (or excluded) from the digest process. In some examples, selection criteria is specified by reference to an external source such as a standardized canonical form. One approach is to specify selection criteria in a universal resource identifier embedded in a file within the document. In some examples, selection criteria is specified external to the file to be digested. An example standard for digesting contracts includes content files only (e.g., "document.xml" and "image1.svg") because the formatting information is not relevant to the substance of a legal contract. An example standard for digesting a published work only excludes metadata because formatting often enhances, and sometimes defines, a published work. An example standard for digesting computer aided design (CAD) files includes structural design elements while excluding simulation inputs and results. Another example standard for digesting CAD designs excludes corporate logos, copyright notices, and other non-engineering information. An example specification of canonical form includes forms for different types of documents including word processing documents, spreadsheets, and presentations.

In some examples, package part selector 114 selects parts of an OPC package contents for a Microsoft Office™ document based on the reference type for the information in the package. In one approach, package part selector 114 selects all package parts that identify the content, style, and layout of the document as represented in the OPC package. Thus, package part selector 114 excludes certain metadata, such as the last accessed date, of the digital file that is deemed not be relevant to the integrity or authenticity of the file. As an example, package part selector 114 excludes certain information in the OPC package, such as custom parts and references to custom XML properties in the OPC package. In some examples, package part selector 114 selects parts of an OPC package based on information described in manifest file. Package part selector 114 selects information where ContentType="application/vnd.openxmlformats-package.relationships+xml" or "application/vnd.openxmlformats-package.digital-signature-xmlsignature+xml."

In some examples, relationship information processor 116 may reorder blocks of information in a canonical form to further the purposes of the present disclosure. In some examples, relationship information processor 116 identifies structured data within the document that is equivalent when reordered. Relationship information processor 116 reorders that data in a canonical form to maintain a consistent order of information to be fed into the hash function. In some examples, relationship information processor 116 sorts the contents of a manifest file according to the uniform resource locator values within that file. In some examples, relationship information processor 116 sorts the contents of "styles.xml" according to the name of the styles. In some examples, relationship information processor 116 generates a hash value of the contents of each element in an order-less XML file and sorts the elements based on the generated hash values.

In some examples, a structured document includes relationship information specifying details of the relationships between files and data in the package representing the document. The relationship information provides a roadmap for a document viewer/editor to navigate the files within the document and specifies relationships between the same. In some examples, the relationship information of the package is specified in a markup language, such as XML. For example, an OPC package includes relationship information specifying the relationships between the various parts of the package. The relationship information in the OPC package is stored or identified in a manifest file using the <Relationships> tag. An example tag is: <Relationshipsxmlns="http://schemas.openxmlformats.org/package/2006/relationships">.

In some examples, the relationship information is generated based on the order files are stored in the package. If documentA and documentB contain the same files but in different orders, a hash over the contents of documentA will differ from that of documentB even though both documents would appear identical when viewed. Relationship information processor 116 therefore sorts the contents of the manifest file before that file is fed into the hash function to provide consistent hashing of the relationship information independent of the order files are stored in the package.

Figure 2:
FIG. 2 is a word processing document according to embodiments of the present disclosure.

FIG. 2 is a word processing document according to embodiments of the present disclosure. Document 200 is shown in a word processing program such as Microsoft Word™ in a print-preview mode. Document 200 may include content such as title 202, bulleted text elements 204, image 206, and table 208. Document 200 may be the first page of a multi-page document. Document 200 may also include other data (e.g., meta-data) that is not visible when viewing or editing the document. For example, the meta-data may record when the document was created, last edited, and last opened.

Figure 3A:
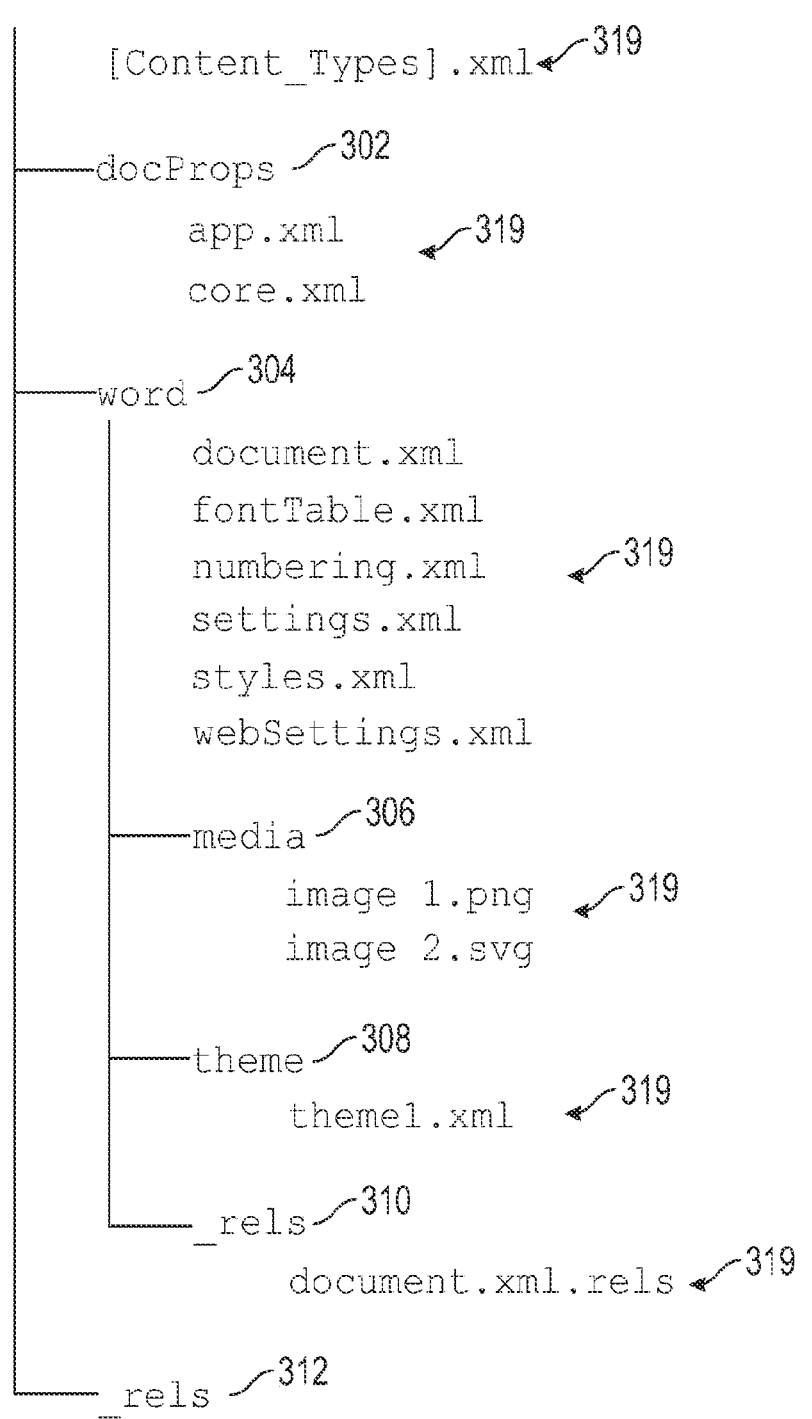
FIGS. 3a-3c illustrate the internal structure of structured documents according to embodiments of the present disclosure.

FIG. 3a illustrates the internal structure of a document according to embodiments of the present disclosure. Document 300 in disk 106 as an Open Office Extensible Markup Language (OOXML) format file, such as that created by Microsoft Word™. Document 300 is stored as a ZIP archive file container containing files organized in subdirectories. Document 300 contains subdirectories 302-312 and files 319. This collection of files may be loaded by word processing program into RAM 104 and viewed as illustrated in FIG. 2.

File 319 named "[Content_Types].xml" defines types of content used in document 300 and references other files 319 within document 300. Folder 302 is named "docProps" and contains metadata about document 300. For example, file 319 named "app.xml" identifies the application used to create the document as "Microsoft Office Word" version 16.0000. File 319 named "core.xml" enumerates document properties including the subject of the document, the creator, the creation date, and the last modified date for document 300. In some examples, folder 302 may also include a file named "custom.xml", which contains additional metadata beyond the standard metadata fields. Package part selector excludes the files in folder 302 including "app.xml", "core.xml", and "custom.xml". Folder 304 is named "word" and includes six files of textual content and formatting that makes up document 300. File 319 named "document.xml" contains the text for document 300 including the title, the text of a bulleted list, and the text of a table. File 319 named "fontTable.xml" enumerates the fonts used in document 300 and file 319 named "numbering.xml" describes the style of the bullet symbols used in the bulleted list. File 319 named "settings.xml" specifies some settings for the word processing application such as the formatting of hyperlinks as shown in document 200. File 319 named "styles.xml" enumerates the defined formatting styles used in the document. File 319 named "webSettings.xml" references various XML, schemas for converting the document to HTML for web viewing.

Folder 306 contains includes two image files. Image files 319 are named "image1.png" and "image2.svg" and are two different image files for the same airplane icon 206. Folder 308 contains a single file 319 named "theme1.xml", which defines a document theme used by Microsoft Word to coordinate colors and styles.

Files 319 named "[Content_Types].xml" and "document.xml.rels" are manifests enumerating and classifying the other files in document 300.

Figure 3B:
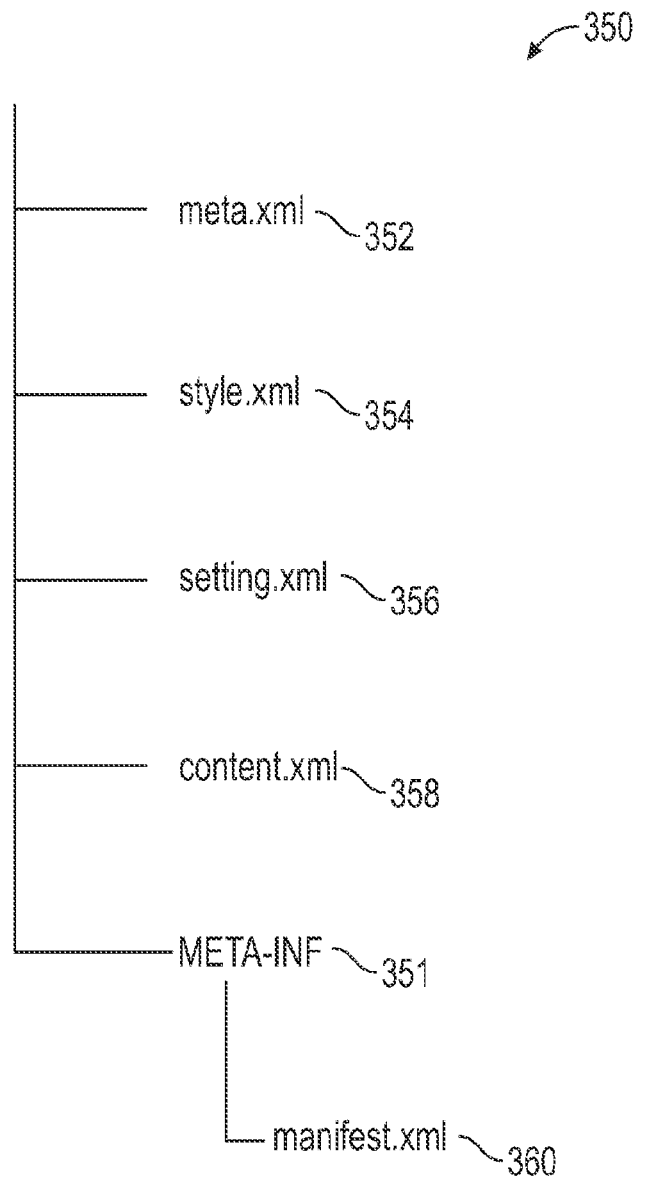

FIG. 3b illustrates the internal structure of a document according to embodiments of the present disclosure. Document 350 in disk 106 as an Open Document Format (ODF)

file. Document 350 is stored as a ZIP archive file container containing files and subfolders. Document 350 contains files 352-360 and subfolder 351. This collection of files may be loaded by word processing program into RAM 104 and viewed as illustrated in FIG. 2. File 352 is named "meta.xml" and contains metadata for document 350 such as the name of the creator of the document, the last printed date, and the name of the software used to create the file. File 354 is named "style.xml" and enumerates the defined formatting styles used in the document. File 356 is named "setting.xml" and contains settings for the word processing program. File 358 is named "content.xml" and contains the content of document 350, such as the text and formatting shown in FIG. 2. File 360 is named "manifest.xml" and enumerates the other defines types of content used in document 350 and references other files 352-360 within document 350. Package part selector excludes file 352.

Figure 3C:
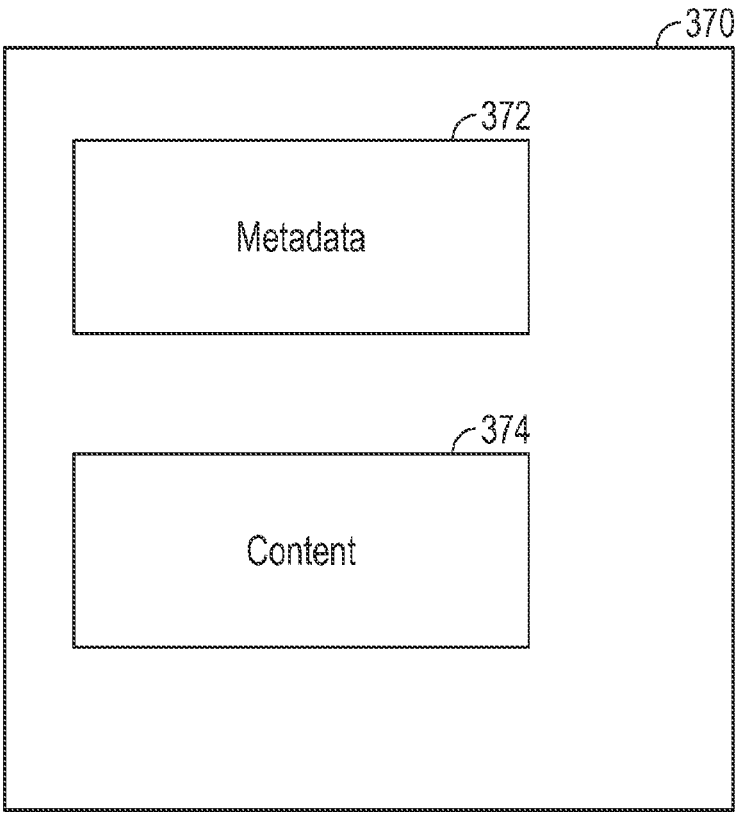

FIG. 3c illustrates the internal structure of a document according to embodiments of the present disclosure. Document 370 is stored in disk 106 as a structured document containing metadata 372 and content 374. Metadata 372 contains metadata for document 370 such as the last printed date. Package part selector excludes metadata 372.

FIG. 4 is an OOXML document contents file according to embodiments of the present disclosure. Contents file 400 is an XML-formatted document that includes elements 402-428. Element 402 is a container of content types found in a document 300. Elements 404-412 define default contents based on file extensions. For example, element 404 defines a content type 404b named "image/png" for a file in the document with file extension 404a named "png", which is a portable network graphics image file. Elements 412-428 define overrides to the default content types. For example, element 412 defines a content type 412b of "document-.main+xml" (shortened in the figure for clarity) for the specific file identified as part 412a named "/word/document.xml". (Unabbreviated content type 412a is "application/vnd.openxmlformats-officedocument.wordprocessingml.document.main+xml".) This content type signifies part 412a is the main contents of a word processing document. Package part selector excludes files referenced by 426 and 428.

Figure 5:
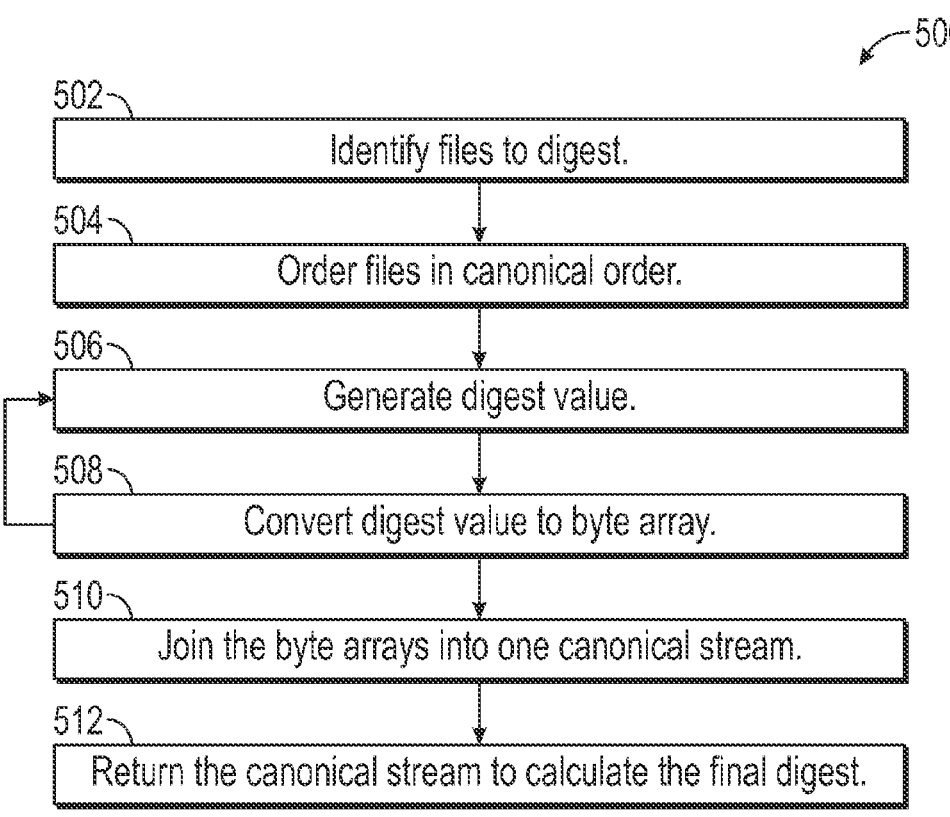
FIG. 5 is a computer-implemented method for generating a digest for a structured document according to certain embodiments of the present disclosure.

FIG. 5 is a computer-implemented method for generating a digest for a structured document according to certain embodiments of the present disclosure. Method 500 includes six blocks of functionality to perform on a document, such as document 108. At block 502, CPU 102 loads a structured document that is a ZIP archive of files and identifies which files will be excluded in the digest process. As discussed above, files in the "docProps" folder are excluded, i.e., app.xml, core.xml, and (if present) custom.xml.

At block 504, CPU 102 orders the non-excluded set of files in a canonical order. In one example, CPU 102 determines the set of files by reading a manifest file included in the ZIP archive. In another example, CPU 102 determines the set of files by listing the files in the ZIP archive. CPU 102 sorts the file references in alphabetical order to generate a sorted list. In some examples, the list of files in a document is shown in FIG. 3a. In some examples, CPU 102 sorts the file references alphabetically by path (or URL) as follows:

- _rels/*/.rels
- word\_rels\document.xml.rels
- word\document.xml
- word\fontTable.xml
- word\media\image1.png -continued

- word\media\image2.svg
- word\numbering.xml
- word\settings.xml
- word\styles.xml
- word\theme\theme1.xml
- word\webSettings.xml Relationship files (e.g., those with a ".RELS" extension) may be preprocessed with a relationship transform algorithm such as the one specified in part 12.2.4.26 of Office Open XML, Part 2: Open Packaging Conventions (December 2006) (available at https://www.ecma-international.org/publications-and-standards/standards/ecma-376/). This processing includes steps to remove ignorable content, versioning instructions, references to missing parts, etc. This processing also includes sorting relationships by their Id value. This processing also omits any relationship from a relationship file where that relationship references a part omitted by the package part selector. A relationship entry in a relationships file includes a relationship identifier and a target filename, as in the following example:

```
<Relationship Id="rId2"
Type="http://schemas.openxmlformats.org/officeDocument/2006/relationships/styles"
Target="styles.xml"/>
```

In block 506, CPU 102 generates a digest value for a file in the list of files to hash. CPU 102 reads the content of the current file as a stream of bytes and feeds that data into a specified hash function. The output of the hash function is a digest.

In block 508, CPU 102 converts the digest from block 506 into a byte array stored in RAM 104. This byte array is a suitable input for a hash function. Blocks 506 and 508 are repeated for each file.

In block 510, CPU 102 joins the byte arrays from block 508 with a single canonical stream. If additional files have not been digested, CPU 102 returns to block 506.

In block 512, CPU 102 returns the canonical stream to calculate the final hash. CPU 102 reads the bytes of data from the canonical stream and feeds that data into a hash function. The resulting digest is stored in RAM 104 and is available for comparison with a preexisting digest value or for incorporation into a new digital seal.

In some examples, blocks 502, 504, and 506 are rearranged without impacting the result of method 500.

Figure 6:
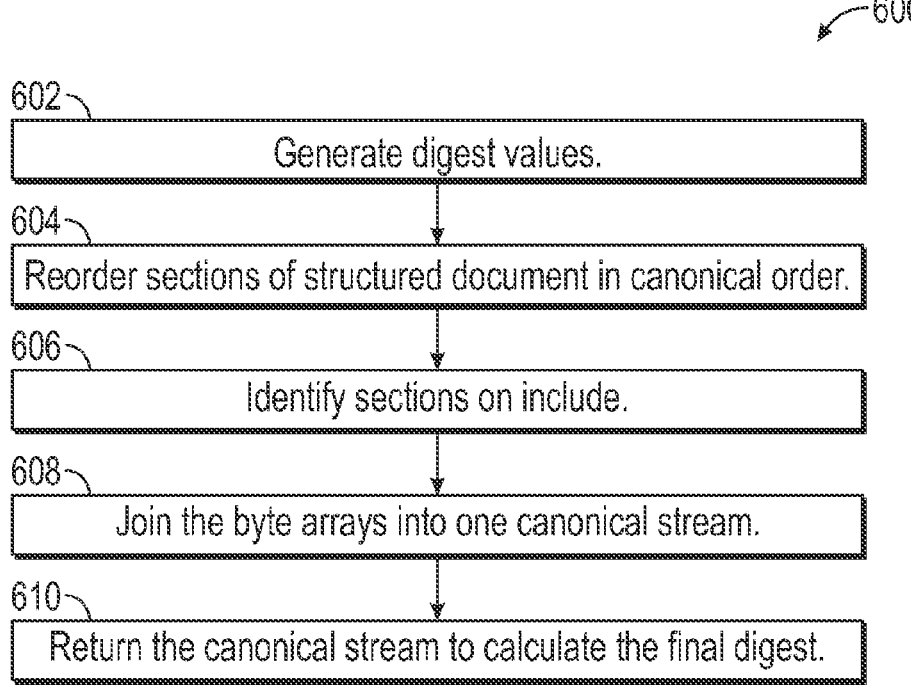
FIG. 6 is a computer-implemented method for determining a digest for a structured document according to certain embodiments of the present disclosure.

FIG. 6 is a computer-implemented method for determining a digest for a structured document according to certain embodiments of the present disclosure. Method 600 includes six blocks of functionality to perform on a document, such as document 370. XML containers need not contain a unique identifier or other useful key for sorting. Two containers may have the same name with different contents, e.g., a container may identify a bulleted list distinguishable from a different bulleted list container only by the contents and position within the document.

At block 602, CPU 102 loads a structured document comprising containers of elements. CPU 102 generates a digest value for each container and stores the digest in RAM 104 as a byte array associated with its respective container.

At block 604, CPU 102 reorders sections of the structure document in canonical order. CPU 102 sorts the containers by corresponding digest values.

At block 606, CPU 102 identifies which containers are to be excluded from the final digest. In one example, CPU 102 excludes the metadata container that contains document properties.

At block 608, CPU 102 joins the byte array from block 602 with a single canonical stream.

At block 610, CPU 102 returns the canonical stream to calculate the final hash for the relationship information. CPU 102 reads the bytes of data from the canonical stream and feeds that data into a specified hash function (which need not be the same as in block 506). The resulting digest is stored in RAM 104 and is available for comparison with a preexisting digest value or for incorporation into a new digital seal.

Those in the art will understand that a number of variations may be made in the disclosed embodiments, all without departing from the spirit and scope of the invention. For example, although the disclosed embodiments relate to Open XML Microsoft Office file format, the methods described above may be used to seal and verify other formats and types of digital files. The methods described above may be implemented in digital circuitry, instructions for execution by a processor, or any suitable combination thereof.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

The invention claimed is:

1. A computer-implemented method of generating a digest for a structured document comprising:

selecting a subset of a plurality of component parts of an OOXML document to prepare the OOXML document for hashing and/or digital sealing, wherein at least one of the selected subset of component parts is an XML file and wherein selecting the subset excludes files named "docProps\app.xml", "docProps\core.xml", and "docProps\custom.xml";

ordering the selected subset of component parts;

processing a relationships file from the selected subset of component parts as follows:

remove at least one relationship entry that references a component part not included in the selected subset, and sort the relationships by identifier value;

generating a component hash value for each of the selected subset of component parts; and converting each component hash value into a byte array and appending the byte array to a canonical byte stream; and storing a hash and/or digital seal associated with the OOXML document based on the canonical byte stream for determining a future modification of the OOXML document.

2. The computer-implemented method of claim 1, wherein the structured document is an OOXML file, which is a ZIP archive and each of the plurality of component parts is a file.

3. The computer-implemented method of claim 1, further comprising calculating an overall hash value for the canonical byte stream.

4. The computer-implemented method of claim 1, wherein the selected subset of component parts does not include any of the following dates: a date on which the structured document was created; a date on which the structured document was last printed; a date on which the structured document was last edited; and a date on which the structured document was last opened.

5. The computer-implemented method of claim 1, wherein the selected subset of component parts includes a relationships file named "_rels\rels" wherein the relationships file contains a relationship of type "officeDocument".

6. The computer-implemented method of claim 1, wherein the selected subset of component parts does not include a document named "custom.xml".

7. The computer-implemented method of claim 1, further comprising storing the overall hash value for the canonical byte stream in a record; selecting a second subset of the second plurality component parts; ordering a second plurality of component parts of a second structured document; generating a second component hash value for each of the second subset of component parts; converting each second hash value into a second byte array and appending the second byte array to a second canonical byte stream; calculating a second overall hash value for the second canonical byte stream; and determining the structured document is identical to the second structured document in case the second hash value for the second canonical byte stream matches the overall hash value in the record.

8. A non-transitory computer readable medium comprising executable software instructions that when executed:

select a subset of a plurality of component parts of a OOXML document to prepare the OOXML document for hashing and/or digital sealing, wherein at least one of the selected subset of component parts is an XML file and wherein selecting the subset excludes files named "docProps\app.xml", "docProps\core.xml" and "docProps\custom.xml";

order the selected subset of component parts, processing, a relationships file from the selected subset of component parts as follows: remove at least one relationship entry that references a component part not included in the selected subset, and sort the relationships by identifier value;

generate a component hash value for each of the selected subset of component parts;

convert each component hash value into a byte array and appending the byte array to a canonical byte stream; and store a hash and/or digital seal associated with the OOXML document based on the canonical byte stream for determining a modification of the OOXML document.

9. The non-transitory computer readable medium of claim 8, wherein the structured document is an OOXML file, which is a ZIP archive and each of the plurality of component parts is a file.

10. The non-transitory computer readable medium of claim 8, further comprising instructions that when executed calculate an overall hash value for the canonical byte stream.

11. The non-transitory computer readable medium of claim 9, wherein the selected subset of component parts includes a relationships file named "_rels\rels" wherein the relationships file contains a relationship of type "officeDocument".

12. The non-transitory computer readable medium of claim 8, wherein the selected subset of component parts does not include a document named "custom.xml".

13. The non-transitory computer readable medium of claim 8, further comprising instructions that when executed: store the overall hash value for the canonical byte stream in a record; select a second subset of the second plurality component parts; order a second plurality of component parts of a second structured document; generate a second component hash value for each of the second subset of component parts; convert each second hash value into a second byte array and append the second byte array to a second canonical byte stream; calculate a second overall hash value for the second canonical byte stream; and determine the structured document is identical to the second structured document in case the second hash value for the second canonical byte stream matches the overall hash value in the record.

14. The non-transitory computer readable medium of claim 8, wherein the selected subset of component parts does not include any of the following dates:

a date on which the structured document was created;

a date on which the structured document was last printed;

a date on which the structured document was last edited; and a date on which the structured document was last opened.

* * * * *